(12) United States Patent
Wang

(10) Patent No.: US 12,122,202 B2
(45) Date of Patent: Oct. 22, 2024

(54) MULTI-FUNCTIONAL VEHICLE AUTONOMOUSLY OPERABLE UNDER MULTI-TERRAIN CONDITIONS

(71) Applicant: Zhenkun Wang, Marblehead, MA (US)

(72) Inventor: Zhenkun Wang, Marblehead, MA (US)

( * ) Notice: Subject to any disclaimer, the term of this patent is extended or adjusted under 35 U.S.C. 154(b) by 421 days.

(21) Appl. No.: 17/471,809

(22) Filed: Sep. 10, 2021

(65) Prior Publication Data

US 2022/0348049 A1    Nov. 3, 2022

(30) Foreign Application Priority Data

Apr. 30, 2021    (CN) .......................... 202120924186.5

(51) Int. Cl.

| | | |
|---|---|---|
| B60F 5/00 | (2006.01) | |
| A63B 19/02 | (2006.01) | |
| B60F 3/00 | (2006.01) | |
| B60H 1/00 | (2006.01) | |
| B60J 5/04 | (2006.01) | |
| B62K 1/00 | (2006.01) | |
| B62L 3/02 | (2006.01) | |
| B62M 3/00 | (2006.01) | |
| B62M 11/02 | (2006.01) | |
| B63B 1/04 | (2006.01) | |
| B63H 1/38 | (2006.01) | |

(Continued)

(52) U.S. Cl.
CPC .............. B60F 5/003 (2013.01); A63B 19/02 (2013.01); B60F 3/0084 (2013.01); B60H 1/00557 (2013.01); B60J 5/04 (2013.01); B62K 1/00 (2013.01); B62L 3/02 (2013.01); B62M 3/00 (2013.01); B62M 11/02 (2013.01); B63B 1/047 (2013.01); B63H 1/38 (2013.01); B63H 16/12 (2013.01); B64C 3/38 (2013.01); B64C 37/00 (2013.01)

(58) Field of Classification Search
CPC ...... B60F 3/0084; B60F 3/0069; B60F 5/003; B63B 1/047; A63B 19/02; B64C 31/02; B63H 16/14; B63H 16/12
See application file for complete search history.

(56) References Cited

U.S. PATENT DOCUMENTS

| | | | | |
|---|---|---|---|---|
| 520,899 | A * | 6/1894 | Ronk | ........................ B63B 1/12 441/78 |
| 1,915,886 | A * | 6/1933 | Gutierrez | ............. B60K 7/0007 180/209 |

(Continued)

FOREIGN PATENT DOCUMENTS

| | | | |
|---|---|---|---|
| CN | 101428663 A | * | 5/2009 |
| CN | 103129337 A | * | 6/2013 |

(Continued)

*Primary Examiner* — Emma K Frick
(74) *Attorney, Agent, or Firm* — WPAT, PC

(57) ABSTRACT

A completely transparent spherical body is surrounded externally by a plurality of leaf plates arranged in equal spacing along a main outer ring rack of the spherical body. Two rubber tires are included to wrap the spherical body. A rider inside the spherical body pedals to rotate the spherical body forward. A vehicle having the spherical body can be autonomously operated to move on land or water, and in the air. In addition, to operate this vehicle, no specific road or environmental requirement is needed, and no other obstacle, even a traffic accident can stop its movement.

7 Claims, 5 Drawing Sheets

(51) Int. Cl.
  *B63H 16/08*  (2006.01)
  *B64C 3/38*  (2006.01)
  *B64C 37/00*  (2006.01)

(56) References Cited

U.S. PATENT DOCUMENTS

| | | | | |
|---|---|---|---|---|
| 2,838,022 | A | * | 6/1958 | Wilson .................... B63B 1/047 |
| | | | | 441/78 |
| 2,980,054 | A | * | 4/1961 | Sanders ................ B60F 3/0007 |
| | | | | 301/48 |
| 4,163,567 | A | * | 8/1979 | Barber ..................... B62K 1/00 |
| | | | | 180/218 |
| 4,192,395 | A | * | 3/1980 | Barber ................... B62K 17/00 |
| | | | | 280/211 |
| 4,386,787 | A | * | 6/1983 | Maplethorpe .......... A63G 29/02 |
| | | | | 180/10 |
| 4,401,314 | A | * | 8/1983 | Zimmerman .......... A63B 19/02 |
| | | | | 280/78 |
| 4,501,434 | A | * | 2/1985 | Dupuis ................. A63G 29/00 |
| | | | | 441/78 |
| 4,579,336 | A | * | 4/1986 | Morin .................... A63B 19/02 |
| | | | | 441/78 |
| 4,729,446 | A | * | 3/1988 | Sefton .................... A63G 29/00 |
| | | | | 180/21 |
| 6,298,934 | B1 | * | 10/2001 | Shteingold ............. B62D 57/00 |
| | | | | 180/10 |
| 8,499,862 | B2 | * | 8/2013 | Mondl ................... B62D 57/00 |
| | | | | 180/7.1 |
| 9,481,414 | B1 | * | 11/2016 | Thielman ............. G05D 1/0011 |
| 9,493,047 | B2 | * | 11/2016 | Gong ....................... B63H 5/07 |

FOREIGN PATENT DOCUMENTS

| | | | | |
|---|---|---|---|---|
| CN | 104290878 | A | * | 1/2015 |
| CN | 106110662 | A | * | 11/2016 |
| DE | 563586 | C | * | 11/1932 |
| DE | 3836027 | A1 | * | 4/1990 |
| DE | 4015039 | A1 | * | 11/1991 |
| DE | 9010845 | U1 | * | 1/1992 |
| DE | 4343182 | C1 | * | 3/1995 ............. A63B 19/02 |
| DE | 29813536 | U1 | * | 12/1999 ............. A63B 19/02 |
| DE | 102017006384 | A1 | * | 1/2019 ................ B60F 3/00 |
| EP | 0129103 | A1 | * | 12/1984 |
| EP | 2096028 | A2 | * | 9/2009 ............. B63B 1/047 |
| FR | 2161419 | A5 | * | 7/1973 |
| FR | 2567467 | A1 | * | 1/1986 |
| FR | 2626548 | A1 | * | 8/1989 |
| FR | 2708528 | A1 | * | 2/1995 ............ B60F 3/0007 |
| FR | 2867983 | A1 | * | 9/2005 ............. A63B 19/02 |
| GB | 1292441 | A | * | 10/1972 |
| GB | 2224698 | A | * | 5/1990 ............. B60B 19/06 |

* cited by examiner

MULTI-FUNCTIONAL VEHICLE AUTONOMOUSLY OPERABLE UNDER MULTI-TERRAIN CONDITIONS

CROSS REFERENCE TO RELATED APPLICATION

This application claims the benefits of China application Serial No. 202120924186.5 filed on Apr. 30, 2021, the disclosures of which are incorporated by references herein in its entirety.

TECHNICAL FIELD

The present disclosure relates in general to a innovative vehicle, and more particularly to a multi-functional vehicle autonomously operable under multi-terrain conditions.

BACKGROUND

For a long time, human beings have never given up a dream of flying by their own power. The instant disclosure provides an innovative design of vehicle that helps its rider to move in water, land and air by his or her own power. In addition, to operate this vehicle, no specific road or environmental requirement is needed, and no other obstacle, even a traffic accident can stop its movement.

SUMMARY

The instant invention provides a complete transparent spherical body. A main outer ring rack of the spherical body is externally furnished with a plurality of surrounding leaf plates arranged in equal spacing. Two sides of the spherical body are provided by wrapping with two rubber tires. While a rider disposed inside the spherical body pedals, the spherical body would be turned forward.

While exercising on land, the rider inside the spherical body would pedal, and the pedaling of foot pedals would rotate a small gear to further drive a meshed gear to turn the entire spherical body forward, such that the motion of the spherical body as well as the rider thereinside can be realized.

While exercising on water, similar to the operation on land, as the rider inside the spherical body pedals, the pedaling of the foot pedals would rotate the small gear to further drive the meshed gear to turn the entire spherical body forward, such that the leaf plates exterior to the main outer ring rack of the spherical body would paddle the water so as to increase a power for forwarding the spherical body. Since the spherical body can float on the water, air inlets surrounding a control link are furnished to the spherical body by disposing above the waterline, such that water would be prevented from entering the spherical body through the air inlets. Also, such an air-inlet design would prevail in the rainy days.

While the spherical body is operated in the air, two gliding wings should be firstly installed to two opposite extended ends of a central axis of the spherical body, exterior respectively to two bearings on the central axis. Then, flight of the spherical body shall be initiated at a terrain with a certain slope. At a top of the slope terrain, the rider inside the spherical body pedals to accelerate the forward turning of the spherical body down along the slope terrain by transforming the potential energy into the kinetic energy, and finally uplift forcing upon the gliding wings would be induced to flight the spherical body.

Further, since the spherical body and the gliding wings are connected through the corresponding bearings, the positions of the gliding wing would be less affected by the turning of the spherical body, but by an actuating handle of the control link manipulated by the rider to adjust angling and directions. With the accelerations provided by the slope terrain, the gliding wings would be provided with sufficient uplift forcing to take off. In the air, the rider should keep pedaling to turn the spherical body forward, such that the leaf plates would paddle the air downward and backward so as to provide upward and forward forcing to the spherical body. Thereupon, the gliding flight of the spherical body as well as the rider can be realized.

While exercising to land, the spherical body would maintain a certain angle for forward turning. With the gliding wings to keep the gliding flight, the spherical body won't be landed in a free-fall style, but in a certain angle for turning forward and landing. During the landing, the spherical body would maintain the forward turning, and this the rider inside the spherical body would be protected from possible injuries. Since the spherical body is provided with covering shells to protect the rider thereinside, and further a tumbler effect can be provided by disposing the rider lower inside the spherical body, thus rider with shoulder belts on would be kept always in a head-up position no matter how severely the spherical body turns. Thereupon, even facing a collision in landing, the rider would be kept away from an injury.

Working Principle of the Leaf Plates:

FIG. 5 is a schematic side view of the spherical body, in which a top portion thereof is defined to be at a 12 o'clock position. A plurality of grooves are provided to the spherical body, and each of the grooves located at a root portion of the corresponding leaf plate is allowed to roll thereinside a small solid ball 20 with a predetermined weight. The small solid ball 20 would slide back and forth along groove while the spherical body is turned.

At a 6 o'clock position, the leaf plate and the corresponding small solid ball would be both in a natural fall-down state due to the gravity. At this position, the small solid ball and the leaf plate are free from meaningful contact. Namely, at the 6 o'clock position, the small solid ball provides no support to the leaf plate.

Beginning from the 6 o'clock position, when the spherical body keeps turning forward, the water or air would provide the leaf plate with a forward push, and the small solid ball would roll away from the corresponding leaf plate due to the gravity. Thereupon, the small solid ball provides no support to the leaf plate, and thus the leaf plate would be folded, such that negative work from the leaf plate to force the air or water upward or forward can be avoided. In particular, a top portion of the leaf plate is provided according to a heavier wedge design, and thus a distant end of the leaf plate is heavier than a fixed end thereof at the spherical body. According to the gravity, the inertia and the principle of leverage, while the motion direction of the spherical body is changed from a forward direction to a downward direction, the leaf plate would be pushed outward, and at this moment the gravity would drive the small solid ball to roll along the groove to contact a connection end of the leaf plate, such that a support from the small solid ball would be provided to the corresponding leaf plate to prevent the leaf plate from being folded while the air or water is paddled downward or backward. As such, positive work would be performed.

Beginning from a 3 o'clock position, the leaf plate would be completely folded onto the spherical body, and the small solid ball is disposed at a position in the groove away from the leaf plate, such that the spherical body can maintain the forward motion.

With the wedge design to the top portion of the leaf plate, the root portion of the leaf plate (where the leaf plate connects the spherical body) would be lighter, and the top portion 9 thereof would be heavier for the thicker portion at the top portion is added with iron, lead or be like heavier metal. When the leaf plate reaches the 12 o'clock position, and beginning from the leaf plate at the 12 o'clock position, the motion direction of the leaf plate would be changed gradually from the leftward direction to the downward direction.

Due to the inertia and the principle of leverage, the leaf plate be thrown away in a lower front direction. From this moment, i.e., after the 12 o'clock position, the leaf plate would be turned downward, and the small solid ball in the groove would be driven by the gravity to roll from the distant end of the groove away from the leaf plate to a near end thereof close to the leaf plate. Then, as the leaf plate is thrown away, the small solid ball would roll approach the leaf plate to initiate the support. Hence, when the small solid ball keeps moving forward, beginning at about a 10 o'clock position till the 6 o'clock position, the leaf plate is in an unfolded state. As such, with the support from the small solid ball, the leaf plate would keep the unfolded state even facing a reaction from the leaf plate paddling the water or air. Thus, positive work provided by the downward or rearward paddling of the leaf plate upon the water or air can be realized. Hence, for each of the leaf plates to reach the 10 o'clock position, the leaf plate would begin to paddle the water or air downward and rearward so as to provide the spherical body with upward and forward forcing for accelerating the spherical body.

When the spherical body is operated in the air, since the air can only provide limited resistance to the spherical body, then, through adjusting a spherical-body accelerating device B at the control link (FIG. 2-4) to shift the pedal gear to one with less teeth, then gear ratio between the pedal gear and the meshed gear inside the spherical body would be varied. Similar to a variable speed bicycle, the rotation speed of the spherical body as well as the leaf plate would be faster, even though more labors are consumed. Thereupon, the leaf plate are accelerated to paddle the air, and thus the operation of the spherical body in the air would be more effective.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
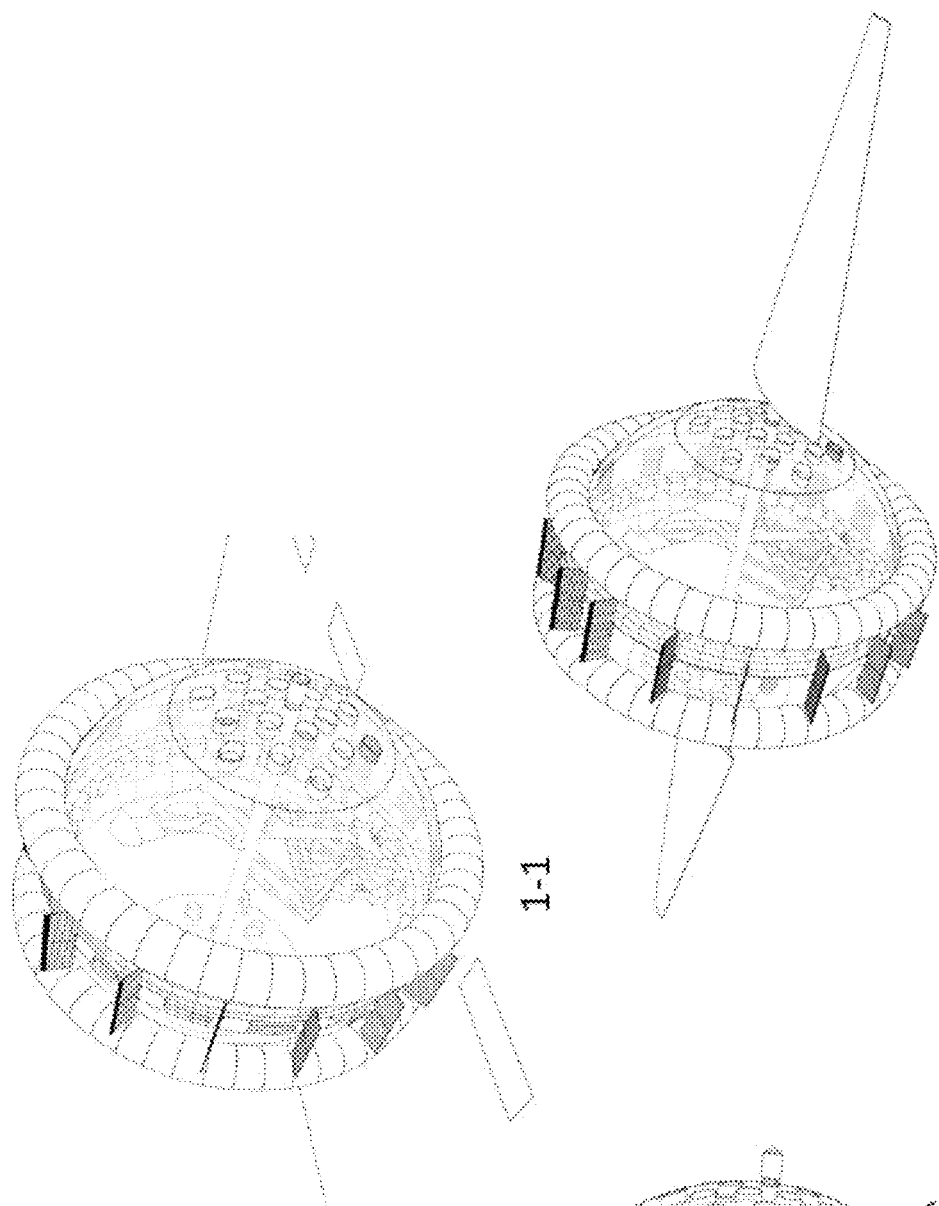
FIG. 1 (including sub-FIGS. 1-1, 1-2 and 1-3) demonstrates schematically three embodiments of vehicles for three operation environments in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
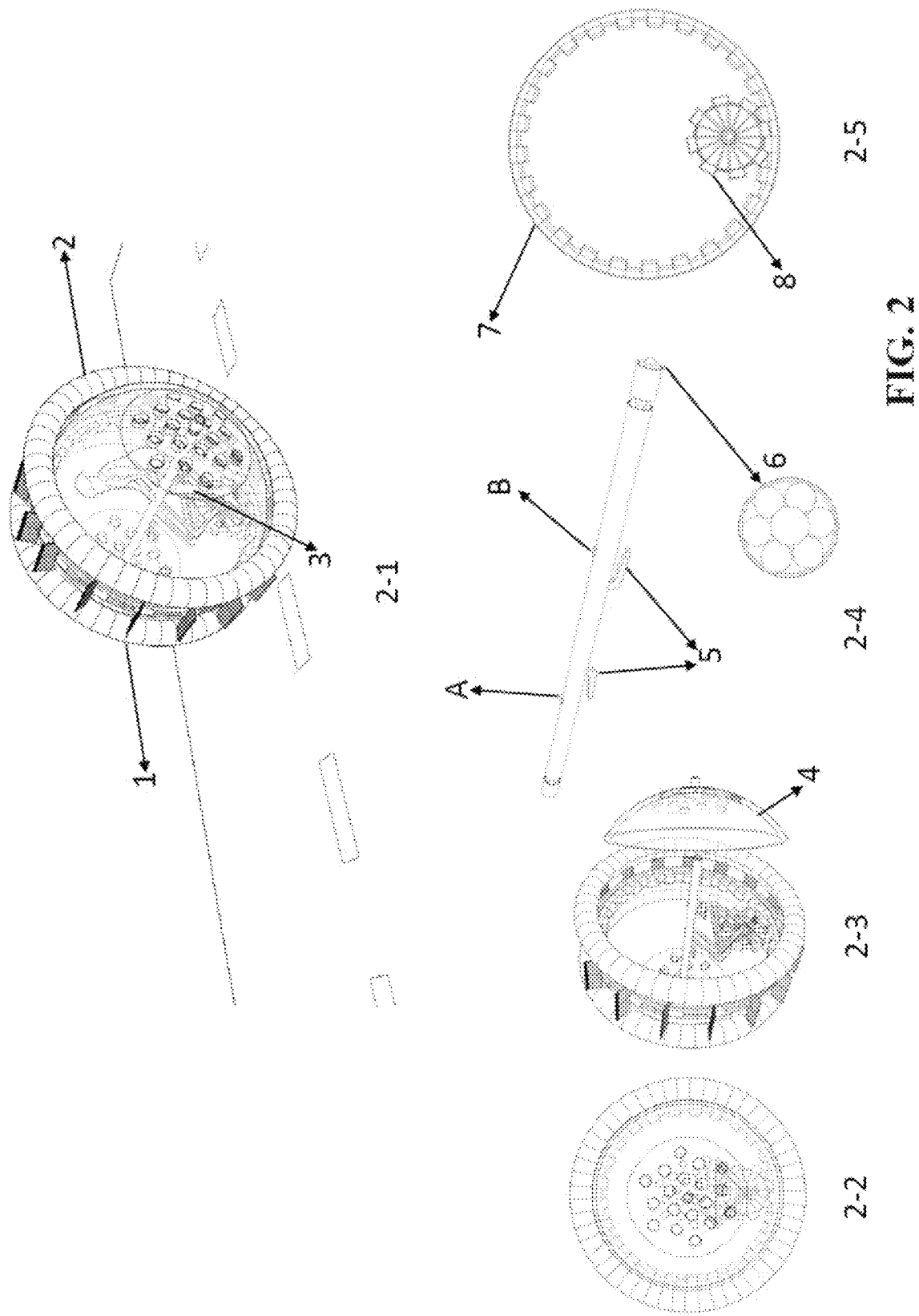
FIG. 2 (including sub-FIGS. 2-1, 2-2, 2-3, 2-4 and 2-5) demonstrates schematically that the vehicle of this disclosure is operated on land.
Figure 3:
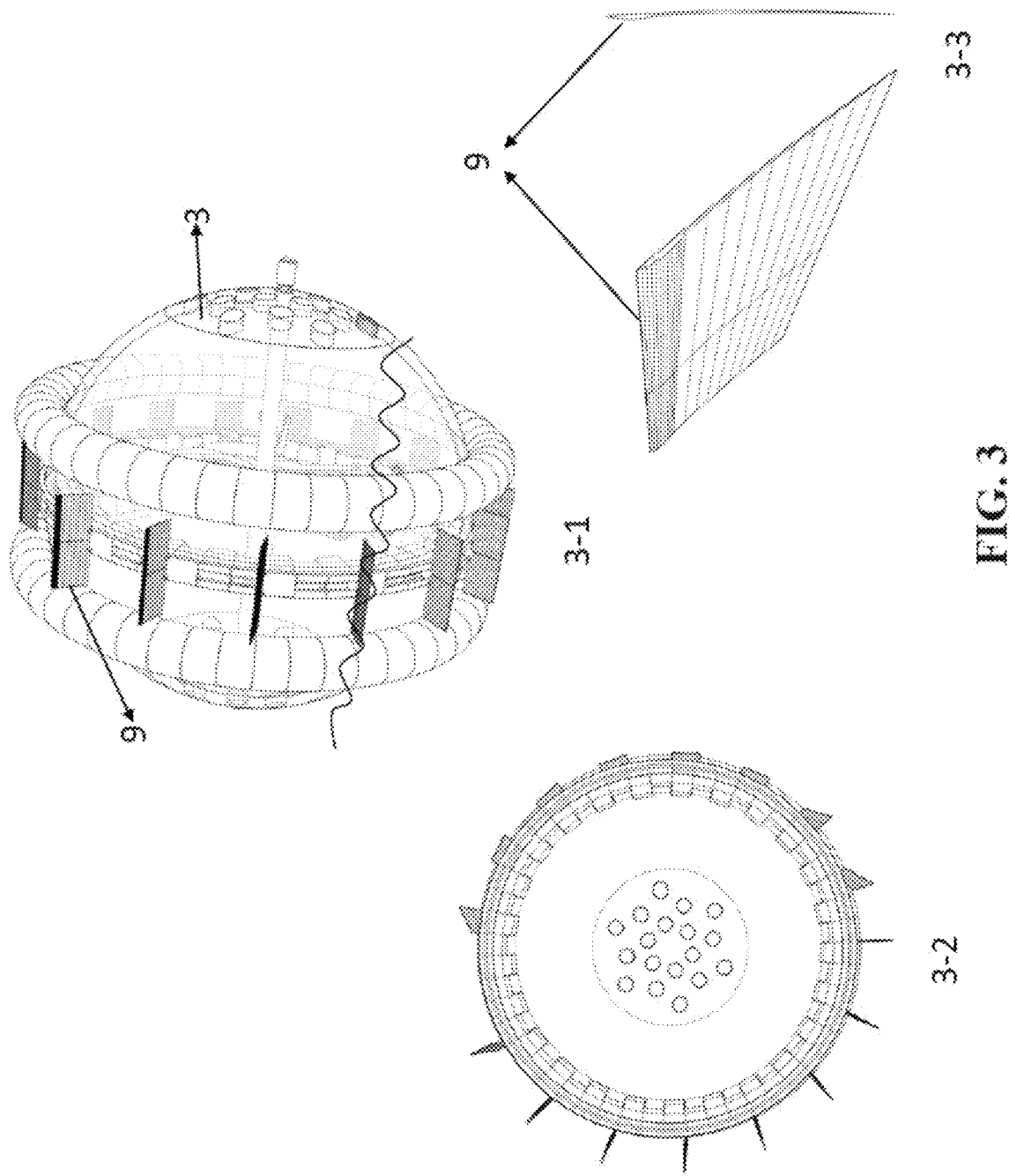
FIG. 3 (including sub-FIGS. 3-1, 3-2 and 3-3) demonstrates schematically that the vehicle of this disclosure is operated on water.

As shown in FIG. 1, three embodiments of the vehicle in accordance with this disclosure are shown schematically to be operated on land, on water and in the air; in which FIG. 1-1 is for use on land, FIG. 1-2 is for use on water, and FIG. 1-3 is for use in the air.

FIG. 2-1 shows schematically the vehicle is operated on land. It can be seen that, through a rider to step the foot pedals inside the spherical body, a smaller gear 8 would be driven to further rotate a meshed big gear 7, such that the entire spherical body would turn forward (see FIG. 2-5). Two rubber tires 1, 2 wrapping the spherical body are to contact the ground. With a control link as a center, a plurality of air inlets 3 are provided to a central portion at each lateral side of the spherical body. FIG. 2-3 illustrates schematically the spherical body with a door 4 open. Through the door 4, the rider can enter or leave the spherical body. The rider is to manipulate a control link penetrating horizontally through a center of the spherical body. The control link has two brake handles 5. The control link is connected with the lateral sides of the spherical body via two corresponding bearings 6. A right-hand-side knob A at the control link can be used for adjusting directions of the gliding wings (see FIG. 2-4), while a left-hand-side knob B at the control link is a spherical-body accelerating device used for adjusting a rotation speed of the leaf plates (see FIG. 2-4). FIG. 2-2 is a side view of the spherical body.

FIG. 3 demonstrates schematically that the vehicle of this disclosure is operated on water. As shown in FIG. 3-1, the leaf plates 9 are equal-spaced arranged to surround the spherical body between the two rubber tires. The leaf plate 9 would be gradually unfolded from the 12 o'clock position while the spherical body is operated in a counter clock direction, and gradually folded after the 5 o'clock position. While the leaf plate is in an unfolded state, the water would be paddled with the rotation of the spherical body, such that kinetic energy would be provided to rotate the spherical body (FIG. 3-2). The air inlets 3 on the lateral sides of the spherical body shall be always kept above the waterline, so that water won't enter the spherical body. In FIG. 3-3, the wedge design upon the leaf plate 9 is shown to make the top portion thicker and the root portion thinner, and thereby the leaf plate 9 can be quickly unfolded by its own gravity to contribute work after it reaches the 12 o'clock position.

Figure 4:
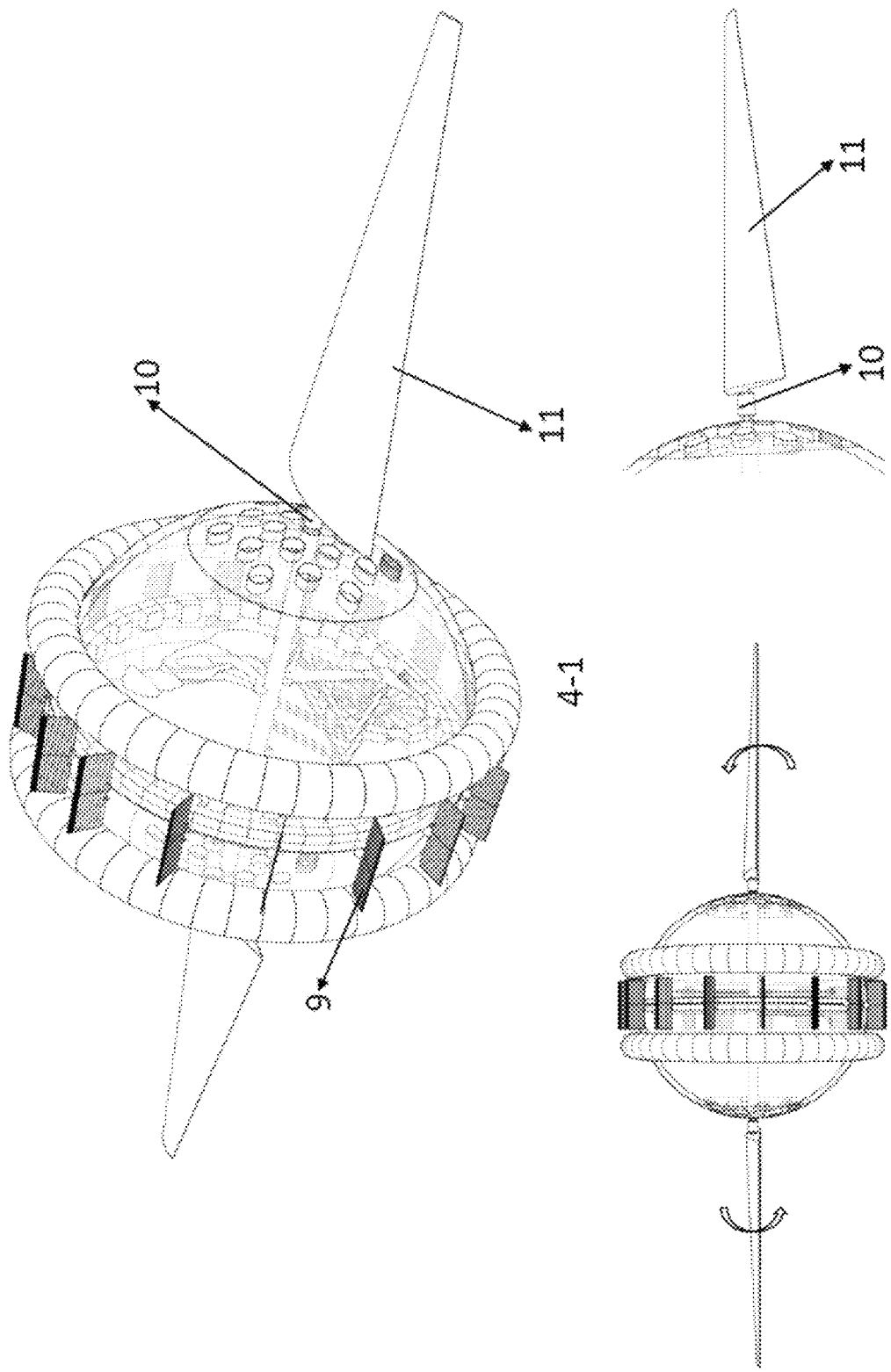
FIG. 4 (including sub-FIGS. 4-1, 4-2 and 4-3) demonstrates schematically that the vehicle of this disclosure is operated in the air.

FIG. 4 demonstrates schematically that the vehicle of this disclosure is operated in the air. When the spherical body is to operate in the air, the gliding wings 11 are connected to the control link via the corresponding bearing 10, such that the gliding wings would not rotate with the spherical body (FIG. 4-3). The direction of the gliding wing 11 to guide the flight of the spherical body is adjusted by the knob 4 at the control link (FIG. 4-2). While the vehicle is operated, the rider steps the foot pedals to rotate the small gear, and then the small gear would rotate the meshed big gear mounted to the inner wall of the spherical body, such that the spherical body would be turned forward. Simultaneously, the leaf plates outside the spherical body would be gradually unfolded from the 12 o'clock position as the spherical body rotates in the counter clock direction. After the 5 o'clock position, the leaf plates would be gradually folded. When the leaf plate is in the unfolded state, the air would be paddled as the spherical body rotates, and thus corresponding kinetic energy would be provided to the spherical body (FIG. 4-1 and FIG. 4-2).

Figure 5:
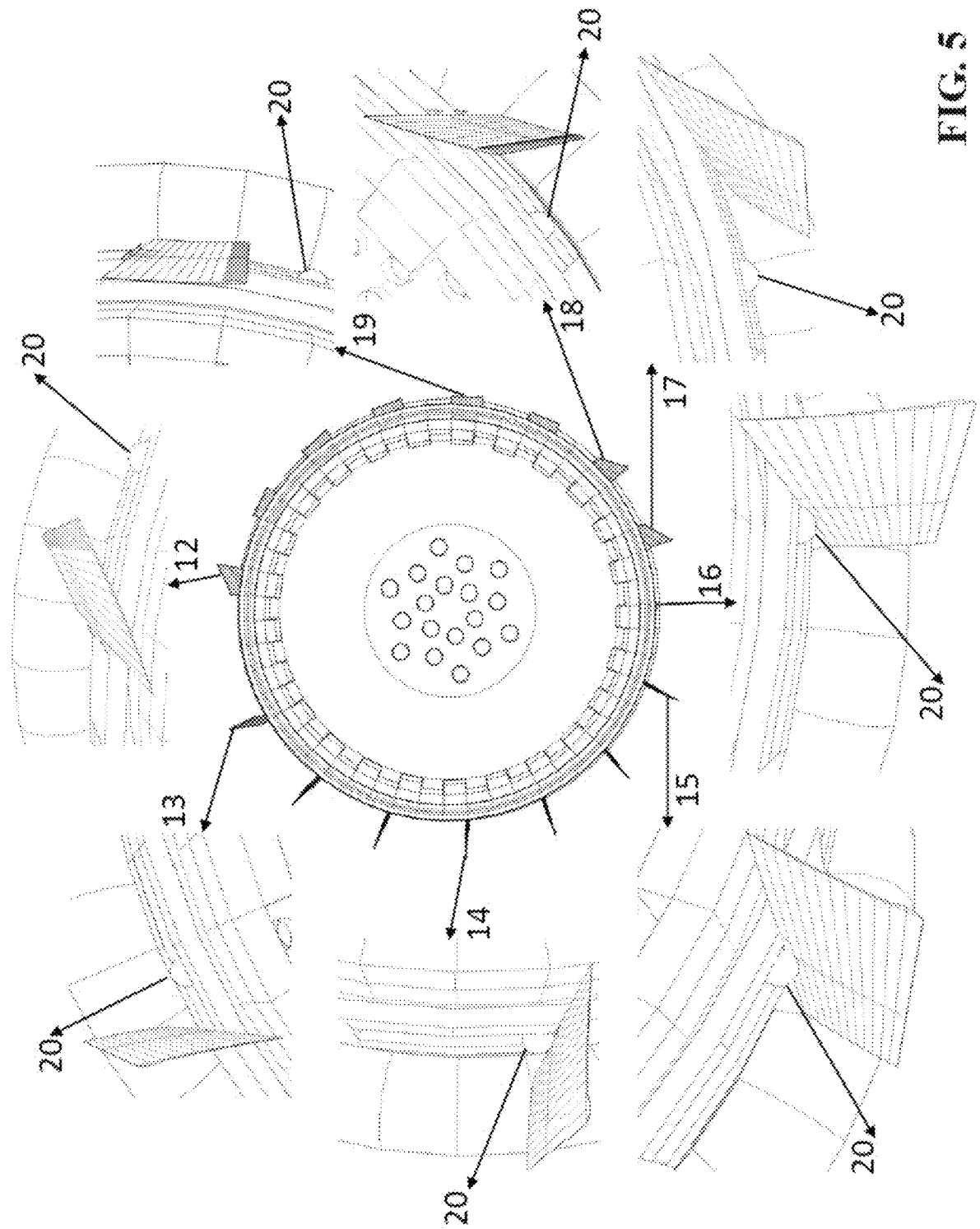
FIG. 5 demonstrates schematically the working principle of the leaf plate in accordance with this disclosure.

FIG. 5 demonstrates schematically the working principle of the leaf plate in accordance with this disclosure. At the right side of each of the leaf plates, a groove accommodating a small solid ball is furnished. While the spherical body rotates, the small solid ball would rotate back and forth along the groove. At the 12 o'clock position where the leaf plate 12 is in the unfolded state, the small solid ball inside the groove would roll to approach the leaf plate 12 as the spherical body rotates. At position 13, the small solid ball is further close to the leaf plate. At position 14, the small solid ball completely contacts and thus fixes the leaf plate at a 90° position. At position 15, the small solid ball would be gradually separated from the leaf plate. At position 16, due to the gravity, the leaf plate 16 would be completely unfolded, and the small solid ball would fix the leaf plate again. At position 17, the small solid ball would begin to roll to another end of the groove from the end thereof close to the leaf plate. At this time, since the resistance of water or air upon the leaf plate is gradually increased, the small solid ball would fail to fix the leaf plate, and thus the leaf plate 17 would form an angle less than 90° with respect to the spherical body. At position 18, the angle between the leaf plate and the spherical body would become smaller in comparison to the position 17. From position 18 to position 12, the leaf plate is completely folded. Thereupon, while the spherical body is rotated in the counter clock direction from position 12 to position 18, the leaf plate would paddle the water or air to provide the kinetic energy to rotate the spherical body. On the other hand, while the spherical body is rotated in the counter clock direction from position 18 to position 12, the leaf plate is completed folded, and thus the resistance thereupon from the water or air can be substantially reduced to affect the rotation of the spherical body.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A multi-functional vehicle operable under multi-terrain conditions, comprising:
   a spherical body, wherein said spherical body is transparent;
   two rubber tires circumferentially wrapped on an exterior of said spherical body;
   an outer ring rack externally furnished on said spherical body, positioned between said two rubber tires, wherein said outer ring rack comprises a plurality of grooves, and said outer ring rack rotates in unison with said spherical body;
   a plurality of solid balls, each positioned inside and configured to slide along a corresponding one of said plurality of grooves; and
   a plurality of leaf plates, each pivotally attached to an exterior of said outer ring rack at a corresponding plurality of root positions;
   wherein said corresponding plurality of root positions are equally-spaced around the outer ring rack;
   wherein one end of one of said plurality of grooves is adjacent to one of said corresponding root positions;
   wherein when each said solid ball sliding within said corresponding one of said plurality of grooves becomes adjacent to said one of said corresponding root positions and contacts a corresponding one of said plurality of leaf plates, said corresponding one of said plurality of leaf plates fully extends away from said outer ring rack and spherical body.

2. The multi-functional vehicle as claimed in claim 1, further comprising:
   a pedal set within said spherical body;
   a small gear within said spherical body; and
   a meshed gear within said spherical body;
   wherein a rider rides inside said spherical body and pedals said pedal set to rotate said small gear to drive said meshed gear for rotating said spherical body forward as a whole.

3. The multi-functional vehicle as claimed in claim 1, further comprising:
   a set of gliding wings, wherein said set of gliding wings connects to said spherical body and are isolated kinetically from said spherical body via a bearing; and
   an actuating handle for controlling rotation of said set of gliding wings.

4. The multi-functional vehicle as claimed in claim 1, further comprising:
   a plurality of venting holes.

5. The multi-functional vehicle as claimed in claim 1, wherein said spherical body further comprises a first half and a second half, and said a first half swings open for a rider to enter said multi-functional vehicle.

6. The multi-functional vehicle as claimed in claim 1, further comprising:
   a control link within said spherical body and connected with each lateral side of said spherical body via a corresponding bearing; and
   a set of gliding wings connected to said control link via said bearings.

7. A multi-functional vehicle operable under multi-terrain conditions, comprising:
   a transparent spherical body;
   two rubber tires circumferentially attached to an exterior of said spherical body;
   an outer ring rack positioned between said two rubber tires, externally furnished on said exterior of said spherical body and rotating in unison with said two rubber tires and said spherical body;
   a plurality of solid balls;
   a plurality of grooves in the outer ring rack, each accommodating a corresponding one of the plurality of solid balls sliding within; and a plurality of leaf plates, each pivotally attached on an exterior of said outer ring rack at a corresponding plurality of root positions;

wherein said plurality of leaf plates and said corresponding plurality of root positions are uniformly spaced on said outer ring rack;

wherein each of said plurality of grooves is positioned adjacent to one of said corresponding root positions, such that when each solid ball sliding within a corresponding one of said plurality of grooves becomes adjacent to said one of said corresponding root positions and contacts a corresponding one of said plurality of leaf plates, said corresponding one of said plurality of leaf plates fully extends away from said outer ring rack and spherical body.

* * * * *